United States Patent Office 3,219,523
Patented Nov. 23, 1965

---

3,219,523
1,3,5 - TRIS(CYANOMETHYL)HEXAHYDRO - 1,3,5-TRIAZINE AS A BACTERICIDE AND FUNGICIDE
Bogislav von Schmeling, Hamden, Conn., assignor to United States Rubber Company, New York, N.Y., a corporation of New Jersey
No Drawing.  Filed Nov. 14, 1963, Ser. No. 323,581
10 Claims.  (Cl. 167—33)

This invention relates to a new fungicide and bactericide, particularly for use as a seed protectant and soil fungicide for protecting seeds and seedlings emerging from seeds against attack by fungi, and as a foliage bactericide.

I have found that 1,3,5-tris(cyanomethyl)hexahydro-1,3,5-triazine is an effective soil fungicide, especially for protecting seeds and seedlings from pre-emergence and post-emergence damping-off caused by plant pathogenic soil organisms, and is an effective bactericide. The chemical is known (Reference Beilstein, 4th Edition, Vol. II, second supplement, page 88). The chemical possesses a broad spectrum controlling effect against such soil pathogens as Rhizoctonia spp. and Pythium spp. without injury to crops. The chemical is also a bactericide controlling such economically important bacteria as *Pseudomonas aeruginosa* and *Xanthomonas phaseoli*.

The chemical may be applied to seeds by tumbling the chemical with the seeds, either alone or in admixture with a powdered solid carrier, to coat the seeds. Typical powdered solid carriers are the various mineral silicates, e.g., mica, talc, pyrophillite, and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, non-ionic, or cationic surface-active agents. Such surface-active agents are well known and reference is made to U.S. Patent No. 2,547,724, columns 3 and 4 for detailed examples of the same.. As a seed protectant, the amount of the chemical coated on the seeds will be 1 to 10 ounces per hundred pounds of the seed. As a soil fungicide, the chemical may be applied as a dust in admixture with sand or dirt or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds. As a soil fungicide, the amount of the chemical applied to the seed rows will be from ½ to 10 pounds per acre applied to the seed rows the equivalent of an area 2″ wide and 2″ deep to parallel rows in one direction a distance of 40″ apart. Also, as a soil fungicide, the chemical may be applied broadcast as a similar dust or aqueous spray with an application rate of 10 to 200 pounds per acre. As a foliage bactericide, the chemical may be applied to growing plants at a rate of ¼ to 10 pounds per acre. Such application is generally as an aqueous spray which also contains a surface-active dispersing agent, or a surface-active dispersing agent and a powdered solid carrier.

The following examples illustrate the invention. All parts and percentages are by weight.

Example 1

This example illustrates the effectiveness of the chemical of the present invention as a seed and seedling protectant and soil fungicide for the control of pre-emergence damping-off of plant seedlings as measured by its disease control of seeds planted in infested soil by the following test:

Two hundred and sixty-four mg. of 1,3,5-tris(cyanomethyl)hexahydro-1,3,5-triazine were thoroughly mixed in a glass jar with one pound of clean, dry sand. The mixing was accomplished by vigorously shaking the jar which was covered with a screwcap. This masterbatch is then mixed with 6¼ pounds of infested soil to give an 80 p.p.m. (parts per million) concentration of chemical in the soil-sand mixture. The soil used for the chemical treatment was highly infested with a complex of organisms which cause rotting of seeds, such as Pythium spp., Fusarium spp., and Rhizoctonia spp. The incorporation of the masterbatch containing the chemical into the infested soil takes place in a tumbler which was allowed to rotate for five minutes for each mixing operation. This mixing time gave a thorough and even incorporation of the chemical into the infested soil. The treated soil was then placed into five 4″ pots in which five pea seeds per pot are planted about ½″ deep covered with infested, treated soil, i.e., a total of 25 seeds were planted for each chemical soil treatment. An untreated check, replicated five times, in which seeds were planted in the same infested soil but without the chemical treatment was included in the test. Also a check, replicated five times, was included where seeds were planted in sterilized soil without chemical treatment. Immediately after planting, the pots were placed in a control chamber at 45° F. under moist conditions for 10 days. The pots were then transferred to the greenhouse and kept at 72° F. to 78° F. under moist conditions. The results were taken ten days later by counting the number of emerged pea seedlings.

The formula for the determination of the percent disease control is:

$$\text{Percent control} = \frac{AB}{CB} \times 100$$

where

A = percent germination in chemically treated infested soil.
B = percent germination in untreated infested soil.
C = percent germination in untreated sterile soil.

The 1,3,5-tris(cyanomethyl)hexahydro - 1,3,5 - triazine gave 94% disease control in one series of tests, and 100% disease control in a second series of tests five weeks later, at a concentration in soil of 80 p.p.m., which is equivalent to an application rate of 2.4 lbs./acre of the chemical applied to the seed rows the equivalent of an area 2″ wide and 2″ deep to parallel rows in one direction a distance of 40″ apart.

Example 2

This example illustrates the effectiveness of the chemical of the present invention as a seed and seedling protectant and soil fungicide for the control of post-emergence damping-off of plant seedlings.

One hundred and thirty-five mg. of 1,3,5-tris(cyanomethyl)hexahydro-1,3,5-triazine were thoroughly mixed in a glass jar with one pound of clean, dry sand. The mixing was accomplished in the same way as described in Example 1. The treated soil was then placed into five 4″ pots in which five mechanically delinted cotton seeds, Variety Fox-4, per pot were planted. Before covering the seeds, the pots were inoculated with the damping-off producing organism *Rhizoctonia solani*. The seed and the inoculum were then covered with a layer of soil ½″ thick. An untreated check, replicated five times, also containing *Rhizoctonia solani* but no chemical, and another untreated check, replicated five times without both the fungus inoculum and the chemical, were included in the test. The pots were then transferred to the greenhouse and kept under moist conditions, maintaining a soil temperature of 72° F. to 78° F. The results were taken 20 days later by counting the number of emerged and healthy seedlings in the pots.

The following table gives the percent emergence and percent stand of cotton seedlings for the chemical treatment at a concentration of 40 p.p.m. based on the weight of the treated soil, which is equivalent to an application rate of 1.2 pounds/acre of the chemical applied to the seed rows the equivalent of an area 2″ wide and 2″ deep to parallel rows in one direction a distance 40″ apart as compared to the untreated, inoculated and untreated, uninoculated soil checks.

| Treatment | Percent Emergence | Percent Stand |
| --- | --- | --- |
| Chemically treated inoculated soil | 76 | 68 |
| Untreated, inoculated soil | 72 | 32 |
| Untreated, uninoculated soil | 92 | 92 |

*Example 3*

This example evaluates the chemical of the present invention as a bactericide following agar plate technique.

Thirty-five mg. of 1,3,5-tris(cyanomethyl)hexahydro-1,3,5-triazine was dissolved in 5 ml. of acetone to which was added 45 ml. of a 0.01% aqueous solution of Triton X–100 (surface-active wetting agent) which is isooctyl phenyl polyethoxy ethanol. Three ml. of this chemical preparation was pipetted into a 50 ml. Erlenmeyer flask containing 5 ml. nutrient medium and kept liquified in a water bath at 47° C. The bacterial inoculum consisting of a spore suspension of *Pseudomonas aeruginosa* was then added to this preparation at the amount of 0.25 ml. per flask. Thus the flask contained a chemical concentration of 255 p.p.m. This preparation was then poured into 2½″ Petri plates and incubated at 30° C. Similar tests were made at a concentration of the chemical of 128 p.p.m. The results were taken 24 hours later by examining the plates for bacterial growth with a bacterial colony counter and comparing the chemical treatment with an untreated, inoculated check.

The untreated, inoculated (check) test showed severe bacterial growth, whereas the test with the 1,3,5-tris(cyanomethyl)hexahydro-1,3,5-triazine at a concentration of 128 p.p.m. showed only a trace of bacterial growth, and the test with the chemical at a concentration of 255 p.p.m. showed no bacterial growth.

*Example 4*

This example illustrates the effectiveness of the chemical of the present invention as a foliage bactericide.

Two grams of 1,3,5-tris(cyanomethyl)hexahydro-1,3,5-triazine were dissolved in 40 ml. of acetone and 60 mg. of Tween 20 (surface-active agent) which is polyoxyethylene sorbitan monolaurate.

To this preparation 160 ml. distilled water were added to give a final chemical spray concentration of 1.0%. This preparation was then sprayed on duplicate pots of Tendergreen beans, each pot containing three plants. The growth stage of the beans at the time of the chemical spray was just before expansion of the first trifoliate leaves. The chemical applications were made with a sprayer delivering 2.5 ml. spray per second. After the plants were allowed to dry the primary leaves were slightly injured by lightly pressing a device (meat tenderizer) having protuberances on the surface on the upper leaf surface against a large rubber stopper held underneath the primary bean leaf. This injuring method produced an easier entrance for the bacteria in the subsequent inoculation procedure. The treated and injured plants are then inoculated with a spore suspension of *Xanthomonas phaseoli* by means of spraying for 30 seconds at a delivery rate of 1 ml./second. The pots containing bean plants were included in the test which did not receive the chemical treatment but were injured and inoculated with the bacterium. The pots were then transferred to the greenhouse and kept at 72° F. to 78° F. under moist conditions. The results of the bacterial bean blight were taken 10 days later by checking the degree of severity of the infection which appears as water-soaked spots around the injured leaf areas.

The untreated, inoculated (check) test showed severe bacterial infection, whereas in the test with the 1,3,5-tris(cyanomethyl)hexahydro-1,3,5-triazine showed only moderate bacterial infection and no phytotoxicity.

Having thus described my invention, what I claim and desire to protect by Letters Patent is:

1. The method of protecting seeds and seedlings emerging from seeds against attack by fungi which comprises bringing the seeds into contact with 1,3,5-tris(cyanomethyl)hexahydro-1,3,5-triazine.

2. The method of protecting seeds and seedlings emerging from seeds against attack by fungi which comprises coating the seeds with 1,3,5-tris(cyanomethyl)hexahydro-1,3,5-triazine.

3. The method of protecting seeds and seedlings emerging from seeds against attack by fungi which comprises applying 1,3,5-tris(cyanomethyl)hexahydro-1,3,5-triazine to soil in the area in which seeds are planted before germination of the seeds.

4. The method of protecting seeds and seedlings emerging from seeds against attack by fungi which comprises applying 1,3,5-tris(cyanomethyl)hexahydro-1,3,5-triazine to soil in the area in which seeds are planted before emergence of seedlings.

5. The method of protecting seeds and seedlings emerging from seeds planted in rows in soil against attack by fungi which comprises applying 1,3,5-tris(cyanomethyl)-hexahydro-1,3,5-triazine to the seed rows at a rate of ½ to 5 pounds per acre applied to the seed rows the equivalent of an area 2″ wide and 2″ deep to parallel rows in one direction a distance of 40″ apart.

6. The method of protecting seeds and seedlings emerging from seeds in soil against attack by fungi which comprises applying 1,3,5-tris(cyanomethyl)hexahydro-1,3,5-triazine broadcast to the soil at a rate of 10 to 200 pounds per acre.

7. The method of protecting seeds and seedlings emerging from seeds against attack by fungi which comprises coating the seeds with 1 to 10 ounces per hundred pounds of seed of 1,3,5-tris-(cyanomethyl)hexahydro-1,3,5-triazine.

8. The method of killing bacteria which comprises contacting bacteria with a bactericidal amount of 1,3,5-tris-(cyanomethyl)hexahydro-1,3,5-triazine.

9. The method of controlling bacteria on plants which comprises applying 1,3,5-tris(cyanomethyl)hexahydro-1,3,5-triazine to the plants at a rate of ¼ to 10 pounds per acre.

10. The method of controlling bacteria on growing plants which comprises applying 1,3,5-tris(cyanomethyl)-hexahydro-1,3,5-triazine to the growing plants at a rate of ¼ to 10 pounds per acre.

No references cited.

JULIAN S. LEVITT, *Primary Examiner.*